US012345224B2

(12) United States Patent
Stark et al.

(10) Patent No.: US 12,345,224 B2
(45) Date of Patent: Jul. 1, 2025

(54) MUFFLER AND FILTER SYSTEM

(71) Applicant: MANN+HUMMEL GmbH, Ludwigsburg (DE)

(72) Inventors: Dennis Stark, Mauer (DE); Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 157 days.

(21) Appl. No.: 18/174,181

(22) Filed: Feb. 24, 2023

(65) Prior Publication Data

US 2023/0220822 A1 Jul. 13, 2023

Related U.S. Application Data

(63) Continuation of application No. PCT/EP2021/073276, filed on Aug. 23, 2021.

(51) Int. Cl.
*F02M 35/12* (2006.01)
*F02M 35/02* (2006.01)
*F02M 35/14* (2006.01)

(52) U.S. Cl.
CPC ............................... *F02M 35/1211* (2013.01)

(58) Field of Classification Search
CPC .... F02M 35/024; F02M 35/108; F02M 35/12; F02M 35/1211; F02M 35/02; F02M 35/1244; F02M 35/1277; F02M 35/14; B01D 35/30; B01D 46/4236
See application file for complete search history.

(56) References Cited

U.S. PATENT DOCUMENTS

| | | | | | |
|---|---|---|---|---|---|
| 2,954,096 | A | * | 9/1960 | McMullen | F02M 35/02483 55/498 |
| 3,190,058 | A | | 6/1965 | Farr et al. | |
| 3,511,336 | A | * | 5/1970 | Rink | F04D 29/664 181/224 |
| 4,300,656 | A | * | 11/1981 | Burcham | F02C 7/045 181/214 |
| 4,790,864 | A | * | 12/1988 | Kostun | F02M 35/14 55/497 |
| 5,059,221 | A | * | 10/1991 | McWilliam | F02M 35/021 55/497 |
| 5,163,387 | A | * | 11/1992 | Lee | F02M 35/1233 123/184.38 |

(Continued)

FOREIGN PATENT DOCUMENTS

| | | | |
|---|---|---|---|
| CN | 205736803 | U | 11/2016 |
| CN | 108656899 | A | 10/2018 |

(Continued)

*Primary Examiner* — Edgardo San Martin

(57) ABSTRACT

A muffler for a filter system has a base body with an inlet opening. A fluid guiding rib is externally arranged on the base body so as to guide a fluid to be filtered by the filter system toward the inlet opening of the base body. The fluid guiding rib extends along a first flow direction, wherein the fluid to be filtered passes through the base body along the first flow direction. A filter system with a filter housing and a filter element removably received in the filter housing is provided with such a muffler. The muffler is attached to the filter housing.

15 Claims, 11 Drawing Sheets

(56) References Cited

U.S. PATENT DOCUMENTS

| | | | | |
|---|---|---|---|---|
| 5,164,550 | A * | 11/1992 | Beidl | F02M 35/1227 181/258 |
| 5,756,944 | A * | 5/1998 | Battig | F04D 29/701 181/279 |
| 5,865,863 | A * | 2/1999 | DeSousa | F02M 35/0203 55/497 |
| 5,947,072 | A | 9/1999 | Loy et al. | |
| 5,979,595 | A * | 11/1999 | Harris | F04D 29/703 181/222 |
| 6,148,782 | A * | 11/2000 | Fuesser | F02B 27/0231 123/184.55 |
| 6,299,661 | B1 * | 10/2001 | Bloomer | F02M 35/1038 55/498 |
| 6,386,712 | B1 * | 5/2002 | Warner | B60R 1/06 359/872 |
| 6,736,238 | B2 * | 5/2004 | Kerr | F04D 29/663 181/269 |
| 6,824,119 | B2 * | 11/2004 | Conley | F02D 9/101 251/305 |
| 7,063,730 | B2 * | 6/2006 | Connor | B01D 46/88 55/507 |
| 7,263,961 | B2 * | 9/2007 | Now | F01N 13/082 123/184.21 |
| 7,520,258 | B2 * | 4/2009 | Choi | F02M 35/14 123/184.56 |
| 7,892,307 | B2 | 2/2011 | Freisinger et al. | |
| 7,997,246 | B2 * | 8/2011 | Now | F02M 35/10144 123/184.56 |
| 8,617,279 | B2 * | 12/2013 | Schlesinger | F02M 35/10013 55/385.3 |
| 10,245,541 | B2 | 4/2019 | Kaufmann et al. | |
| 11,136,947 | B2 | 10/2021 | Von Seggern et al. | |
| 11,549,471 | B2 * | 1/2023 | Feld | F02M 35/02475 |
| 2005/0061292 | A1 | 3/2005 | Prellwitz et al. | |
| 2006/0278192 | A1 | 12/2006 | Now | |
| 2009/0049830 | A1 | 2/2009 | Suzuki | |
| 2009/0104024 | A1 * | 4/2009 | Kay | F04D 29/462 415/161 |
| 2011/0203240 | A1 | 8/2011 | Langner | |
| 2012/0204846 | A1 | 8/2012 | Schultz | |
| 2013/0086877 | A1 | 4/2013 | Kori et al. | |
| 2013/0152524 | A1 | 6/2013 | Gensler et al. | |
| 2013/0152528 | A1 | 6/2013 | Disson et al. | |
| 2014/0102058 | A1 | 4/2014 | Kaufmann et al. | |
| 2014/0137525 | A1 | 5/2014 | Cambpell et al. | |
| 2014/0165834 | A1 | 6/2014 | Kaufmann et al. | |
| 2014/0223868 | A1 | 8/2014 | Kaufmann et al. | |
| 2014/0260136 | A1 | 9/2014 | Kaiser | |
| 2015/0082982 | A1 | 3/2015 | Ruhland et al. | |
| 2016/0069307 | A1 | 3/2016 | Tucker et al. | |
| 2016/0102637 | A1 | 4/2016 | Desjardins | |
| 2017/0319997 | A1 | 11/2017 | Jerger | |
| 2018/0036666 | A1 | 2/2018 | Williams et al. | |
| 2018/0229174 | A1 | 8/2018 | Mercier et al. | |
| 2018/0361292 | A1 | 12/2018 | Adamek et al. | |
| 2018/0369732 | A1 | 12/2018 | Karlsson et al. | |
| 2019/0308125 | A1 | 10/2019 | Neef et al. | |
| 2020/0001221 | A1 | 1/2020 | Nelson et al. | |
| 2020/0376425 | A1 | 12/2020 | Neef | |
| 2022/0018316 | A1 | 1/2022 | Holzmann et al. | |

FOREIGN PATENT DOCUMENTS

| | | | | |
|---|---|---|---|---|
| CN | 108928217 | A | 12/2018 | |
| CN | 109372666 | A | 2/2019 | |
| DE | 10328002 | A1 | 1/2005 | |
| DE | 202005001693 | U1 | 6/2006 | |
| DE | 102006020334 | A1 * | 10/2007 | F02M 35/02483 |
| DE | 202007018072 | U1 | 5/2009 | |
| DE | 102012112653 | A1 | 6/2014 | |
| DE | 102013001843 | A1 | 8/2014 | |
| DE | 102014006117 | A1 | 10/2015 | |
| DE | 102015004089 | A1 | 12/2015 | |
| DE | 102018129695 | A1 | 5/2019 | |
| DE | 102019109202 | A1 | 2/2020 | |
| DE | 102020130138 | A1 | 12/2021 | |
| DE | 102020130142 | B3 | 2/2022 | |
| EP | 2213869 | A2 | 8/2010 | |
| EP | 2188033 | B1 * | 6/2014 | B01D 46/0012 |
| EP | 3112658 | A1 | 1/2017 | |
| JP | S6034771 | Y2 * | 10/1985 | |
| JP | 2008202436 | A * | 9/2008 | |
| JP | 2014005760 | A * | 1/2014 | |
| JP | 2016183619 | A * | 10/2016 | |
| JP | 6097186 | B2 * | 3/2017 | |
| JP | 6616736 | B2 * | 12/2019 | |
| JP | 6760776 | B2 * | 9/2020 | |
| KR | 20150065894 | A * | 6/2015 | |
| WO | 2016061604 | A1 | 4/2016 | |
| WO | 2019112560 | A1 | 6/2019 | |

* cited by examiner

MUFFLER AND FILTER SYSTEM

CROSS-REFERENCE TO RELATED APPLICATIONS

This application is a continuation application of international application No. PCT/EP2021/073276 having an international filing date of 23 Aug. 2021 and designating the United States, the international application claiming a priority date of 24 Aug. 2020 based on prior filed German patent application No. 10 2020 122027.8, the entire contents of the aforesaid international application and the aforesaid German patent application being incorporated herein by reference.

BACKGROUND OF THE INVENTION

The present invention concerns a muffler for a filter system and a filter system with such a muffler.

A filter system can comprise a filter housing with a filter element exchangeably received in the filter housing. The filter system can comprise a tubular fluid inlet for sucking in a fluid to be purified into the filter housing. In order to reduce an intake noise of the incoming fluid, a muffler can be attached to the fluid inlet.

SUMMARY OF THE INVENTION

In view of this background, the present invention has the object to provide an improved muffler.

Accordingly, a muffler for a filter element is proposed. The muffler comprises a base body and a fluid guiding rib arranged externally on the base body for guiding a fluid to be filtered by the filter system toward an inlet opening of the base body, wherein the fluid guiding rib extends along a flow direction in which the base body can be flowed through by the fluid.

Since the fluid guiding direction extends along the flow direction and, for example, is not arranged perpendicularly thereto, an improved fluid guiding action can be achieved.

The filter system is in particular an air filter system. For example, the filter system is suitable for filtering intake air of an air compressor or of an internal combustion engine. The base body is preferably a plastic component. In particular, the base body can be an injection-molded plastic component. The fluid guiding rib is connected as one piece, in particular monolithic as one piece, with the base body. "One piece" or "one part" means presently that the base body and the fluid guiding rib form a common component and are not assembled of different components. "Monolithic as one piece" means presently that the base body and the fluid guiding rib are manufactured of the same material throughout.

The number of the fluid guiding ribs is arbitrary. Preferably, at least two such fluid guiding ribs are provided. However, also three, four, five or more than five fluid guiding ribs can be provided. "Externally" means presently that the fluid guiding ribs are arranged at or on an exterior side of the base body. The base body is tubular. However, this does not preclude that the base body, viewed along the flow direction, changes its cross section geometry.

"Along" or "parallel" to the flow direction means presently in particular also that the fluid guiding rib deviates by an angle of, for example, 10°, preferably of 5°, further preferred of 1°, from the flow direction. The flow direction is preferably oriented from the inlet opening toward a filter element received in the filter system. In particular, the flow direction is opposite to a radial direction of the filter element. The radial direction is arranged perpendicularly to a symmetry axis of the filter element and is facing away from it. In particular, the base body in operation of the filter system is flowed through by the fluid. The fluid can be air.

In embodiments, the fluid can be guided along the fluid guiding rib in a flow direction, wherein the flow direction of the fluid along the fluid guiding rib is oriented opposite to the flow direction of the fluid through the base body. The flow direction of the fluid through the base body can also be referred to as first flow direction. The flow direction of the fluid along the fluid guiding rib can also be referred to as second flow direction. "Opposite" means presently in particular that the flow direction of the fluid through the base body and the flow direction of the fluid along the fluid guiding rib are oriented displaced by 180° relative to each other.

In embodiments, the base body is constructed with rotational symmetry in relation to a symmetry axis, wherein the fluid guiding rib extends along the symmetry axis. In particular, the fluid guiding rib extends parallel to the symmetry axis. "Along" or "parallel" can presently also mean that the fluid guiding rib is arranged at a slant at an angle of, for example, 10°, further preferred of 5°, further preferred of 1°, in relation to the symmetry axis. As already mentioned before, the filter element also comprises a symmetry axis. The symmetry axis of the base body is arranged perpendicularly to the symmetry axis of the filter element. This means that the fluid to be filtered impacts perpendicularly on the filter element.

In embodiments, the inlet opening is rounded by means of an inlet rounded portion extending circumferentially about the symmetry axis. This reduces flow losses.

In embodiments, the inlet rounded portion extends out of the inlet opening to an exterior side of the base body. This means the inlet rounded portion can be in contact with the fluid guiding rib or can be connected thereto.

In embodiments, the base body comprises a truncated cone-shaped inlet which comprises the inlet opening and a truncated cone-shaped outlet, wherein the inlet and the outlet are arranged such that the inlet passes by means of a cross section constriction into the outlet. This means the cross section constriction is arranged between the inlet and the outlet. The inlet and the outlet are arranged such that tips of the truncated cone-shaped geometries are arranged so as to face each other. Thus, a trumpet-shaped or hourglass-shaped geometry of the base body results. This geometry ensures noise reduction.

In embodiments, the cross section constriction is surrounded by means of a rounded portion extending circumferentially about the symmetry axis. In this way, flow losses are reduced also.

In embodiments, the outlet is longer than the inlet, viewed along the symmetry axis. For example, the outlet is twice as long or three times as long as the inlet. The inlet opening of the inlet comprises preferably a larger diameter than an outlet opening of the outlet.

In embodiments, the fluid guiding rib extends away from the symmetry axis radially outwardly out of the base body. The fluid guiding rib can extend perpendicularly to the symmetry axis or be oriented perpendicularly thereto.

In embodiments, the muffler comprises moreover a plurality of fluid guiding ribs which are arranged distributed non-uniformly or (as preferred) uniformly about a circumference of the base body. For example, two, three or four fluid guiding ribs are provided. However, also five or more than five fluid guiding ribs can be provided. Between two neighboring fluid guiding ribs, a flow section is thus preferably formed within which the fluid can flow in an oriented and unhindered manner in direction toward the inlet opening, wherein the flow section preferably extends along the second flow direction.

Furthermore, a filter system with a filter housing, a filter element removably received in the filter housing, and such a muffler which is attached to the filter housing is proposed.

The filter housing comprises preferably a housing bottom part and a housing top part removable from the housing bottom part. The filter element which can be exchanged is received in the filter housing. The muffler is in particular attached to the housing bottom part.

In embodiments, the muffler is connected with form fit to a fluid inlet of the filter housing. The fluid inlet is preferably tubular. The fluid inlet can be constructed with rotational symmetry in relation to the symmetry axis of the muffler. For form fit connection of the muffler to the fluid inlet, it can be comprise resiliently deformable snap hooks. A form fit connection is produced by mutual engagement or engagement from behind of two connection partners, presently the snap hooks and the fluid inlet. A form fit connection can be preferably separated without tools. In this way, a simple assembly as well as a simple disassembly of the muffler is possible.

In embodiments, an intermediate space is provided between the muffler and the filter element. This means in particular that the muffler does not contact the filter element. The intermediate space can also be referred to as gap.

In embodiments, the muffler and the filter element are two components separate from each other. The muffler is thus preferably not connected to the filter element.

In embodiments, the muffler, at least in sections, is arranged outside of the filter housing. Preferably, the muffler is arranged completely outside of the filter housing.

BRIEF DESCRIPTION OF THE DRAWINGS

In the Figures, same or functionally the same elements, if nothing to the contrary is indicated, are provided with the same reference characters.

DESCRIPTION OF PREFERRED EMBODIMENTS

Figure 1:
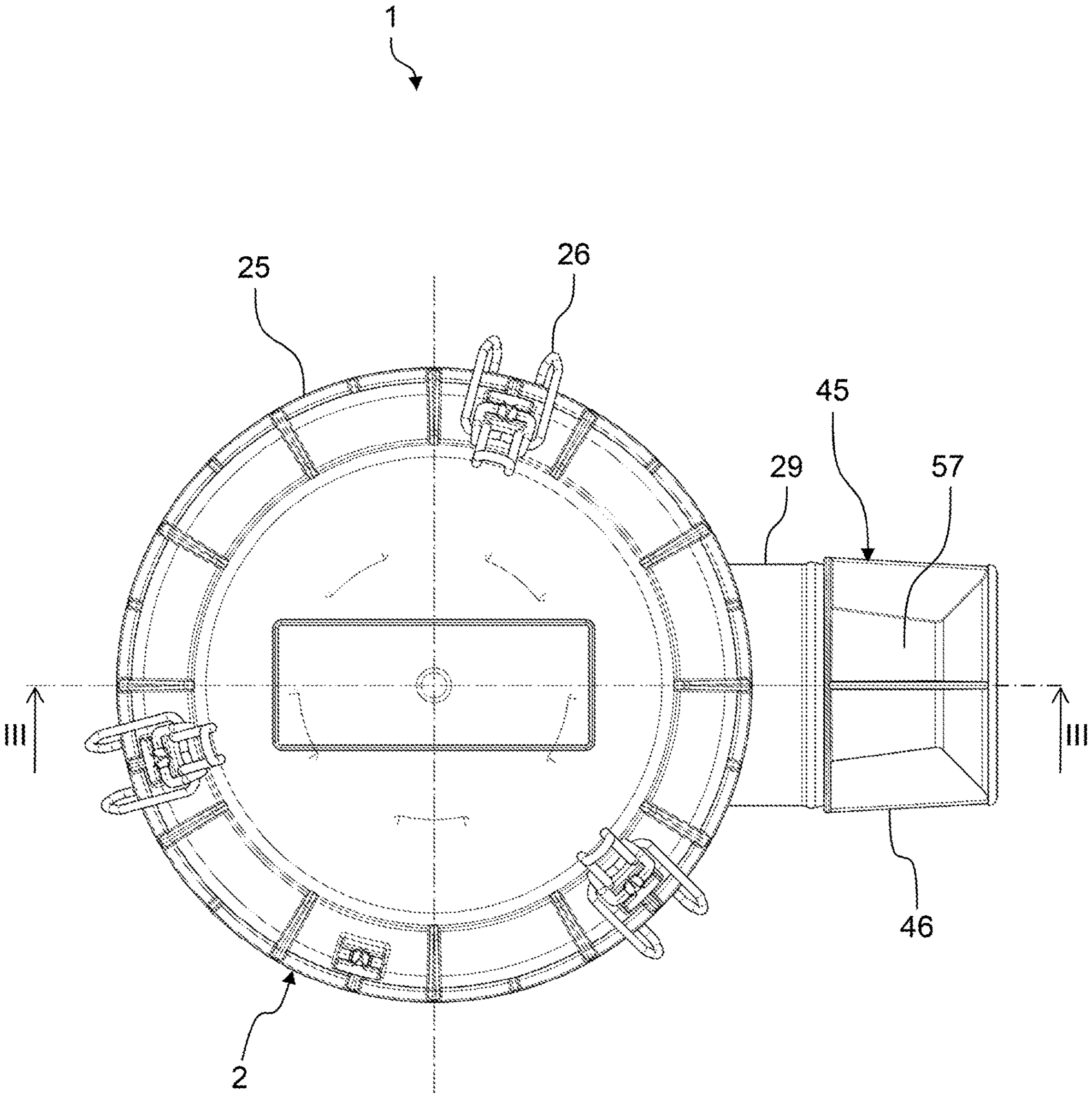
FIG. 1 shows a schematic plan view of an embodiment of a filter system.
Figure 2:
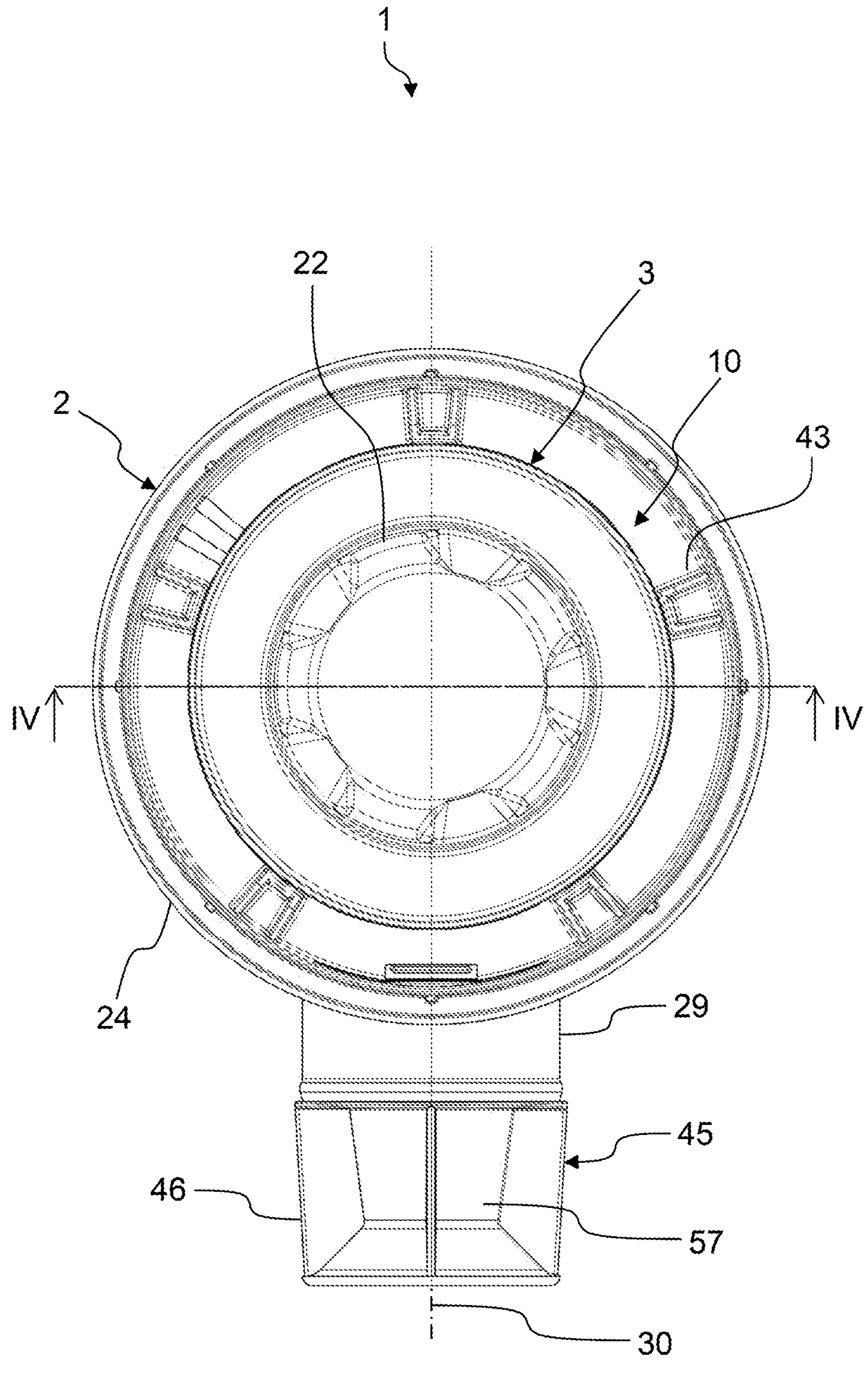
FIG. 2 shows a further schematic plan view of the filter system according to FIG. 1.
Figure 3:
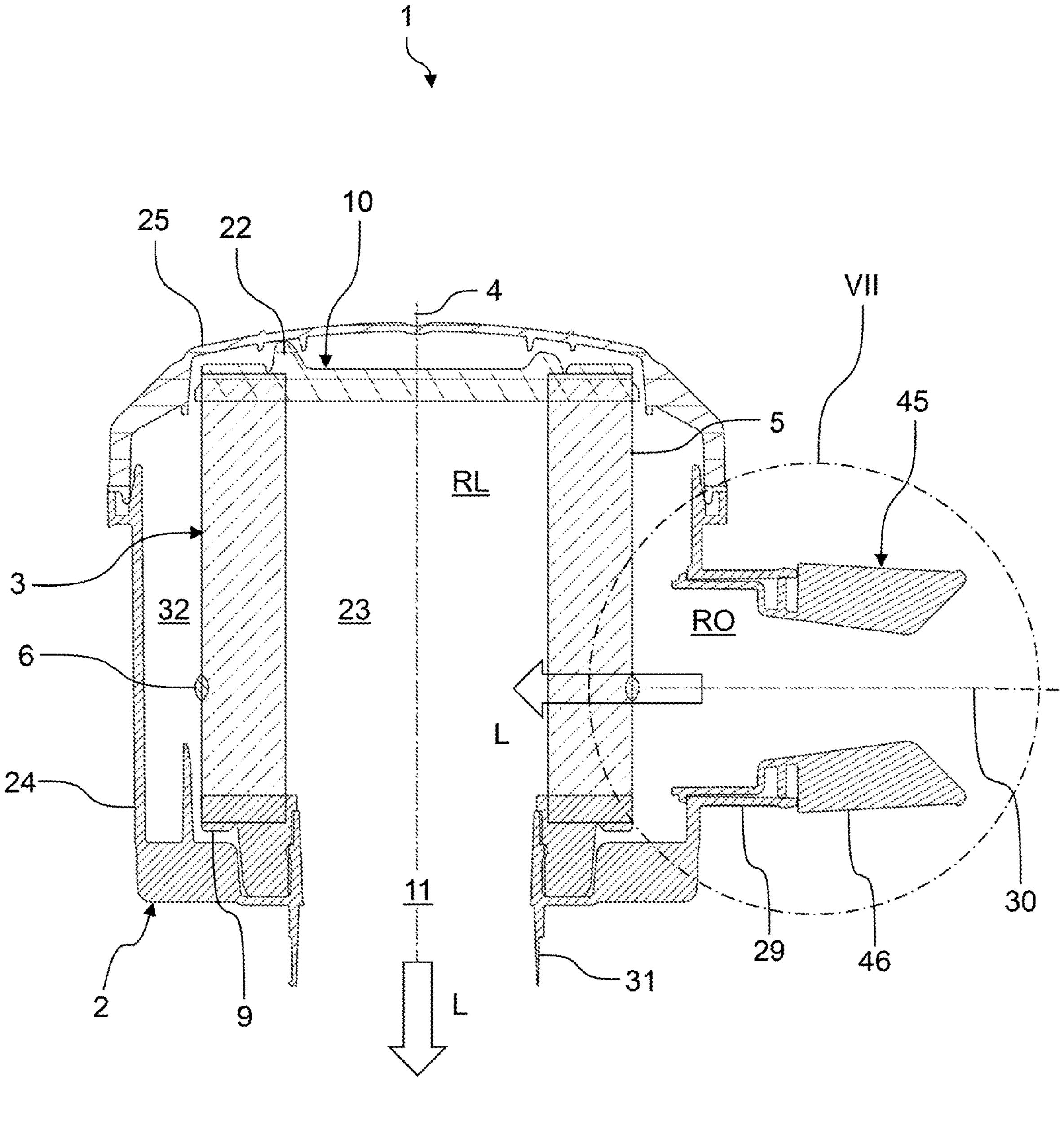
FIG. 3 shows a schematic section view of the filter system according to the section line III-III of FIG. 1.
Figure 4:
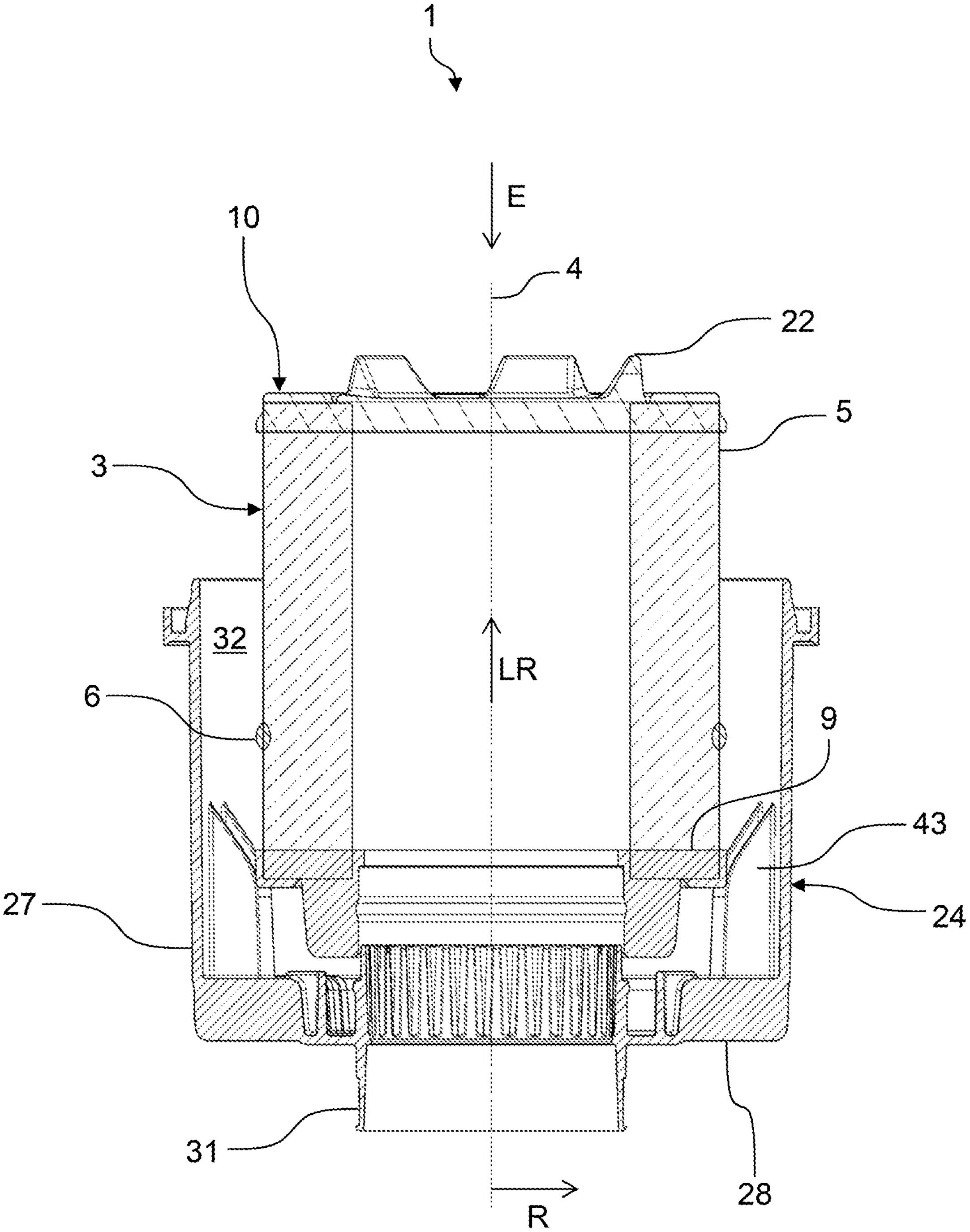
FIG. 4 shows a further schematic section view of the filter system according to the section line IV-IV of FIG. 2.
Figure 5:
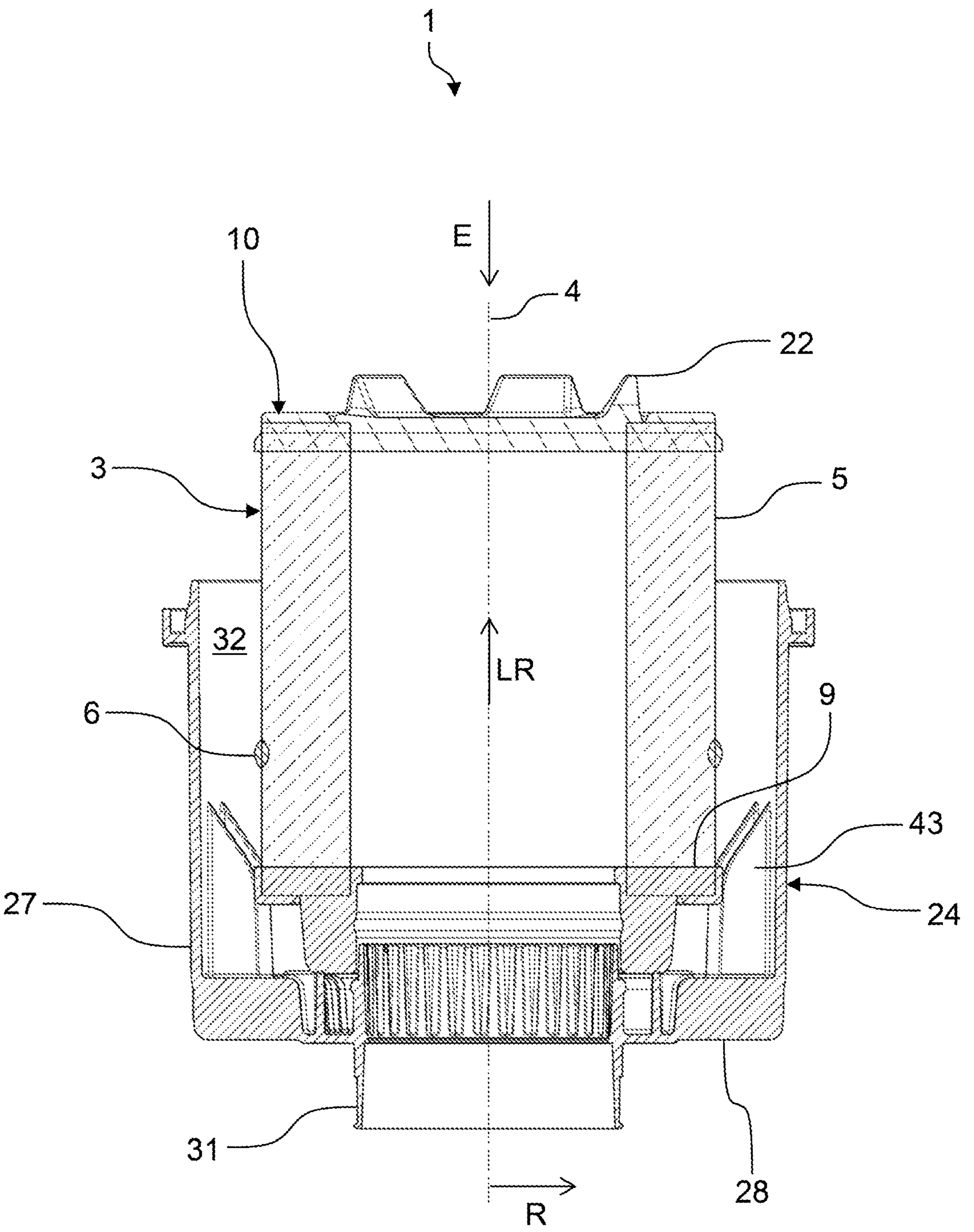
FIG. 5 shows a further schematic section view of the filter system according to the section line IV-IV of FIG. 2.
Figure 6:
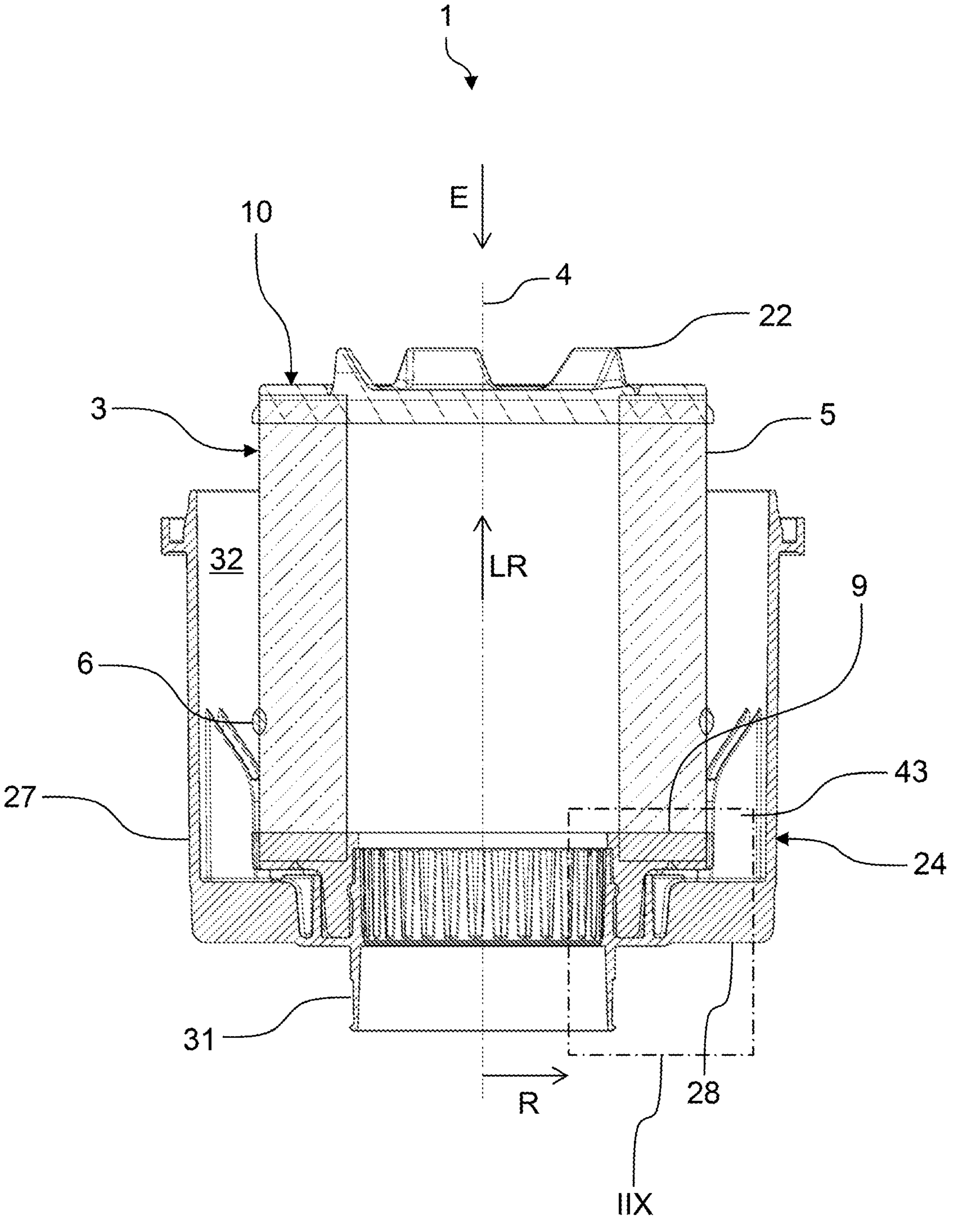
FIG. 6 shows a further schematic section view of the filter system according to the section line IV-IV of FIG. 2.
Figure 7:
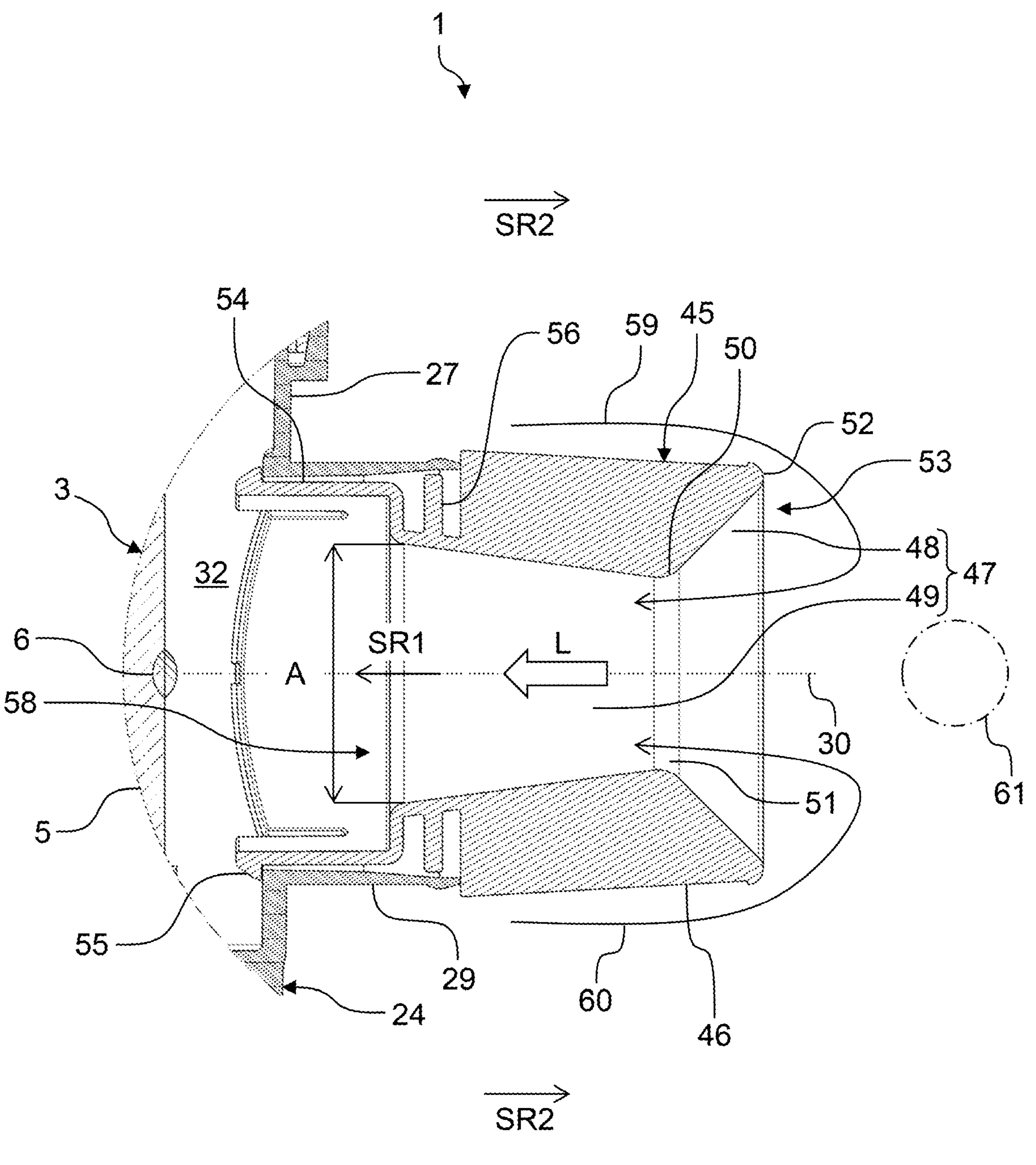
FIG. 7 shows a detail view VII according to FIG. 3.
Figure 8:
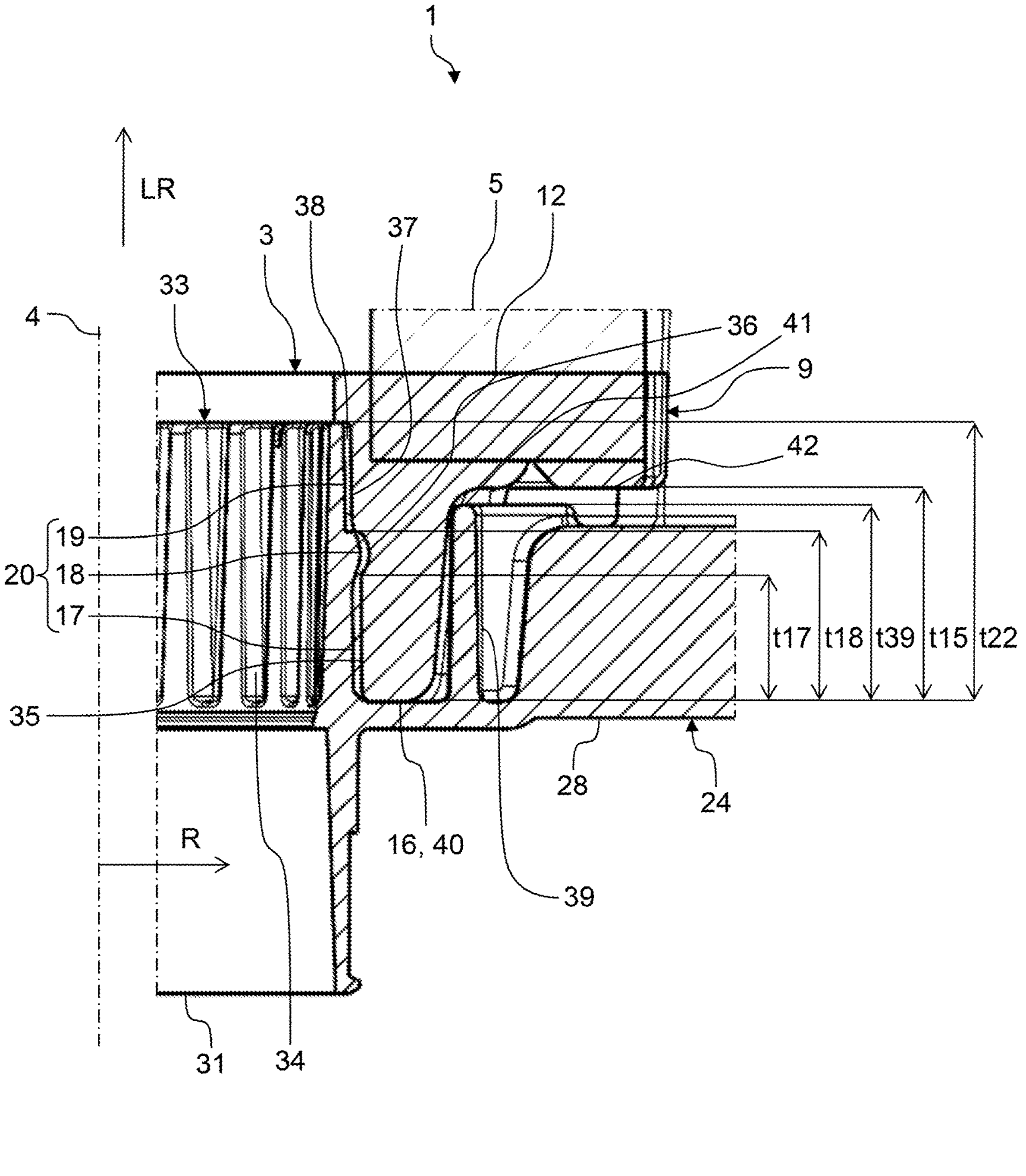
FIG. 8 shows a detail view IIX according to FIG. 6.
Figure 9:
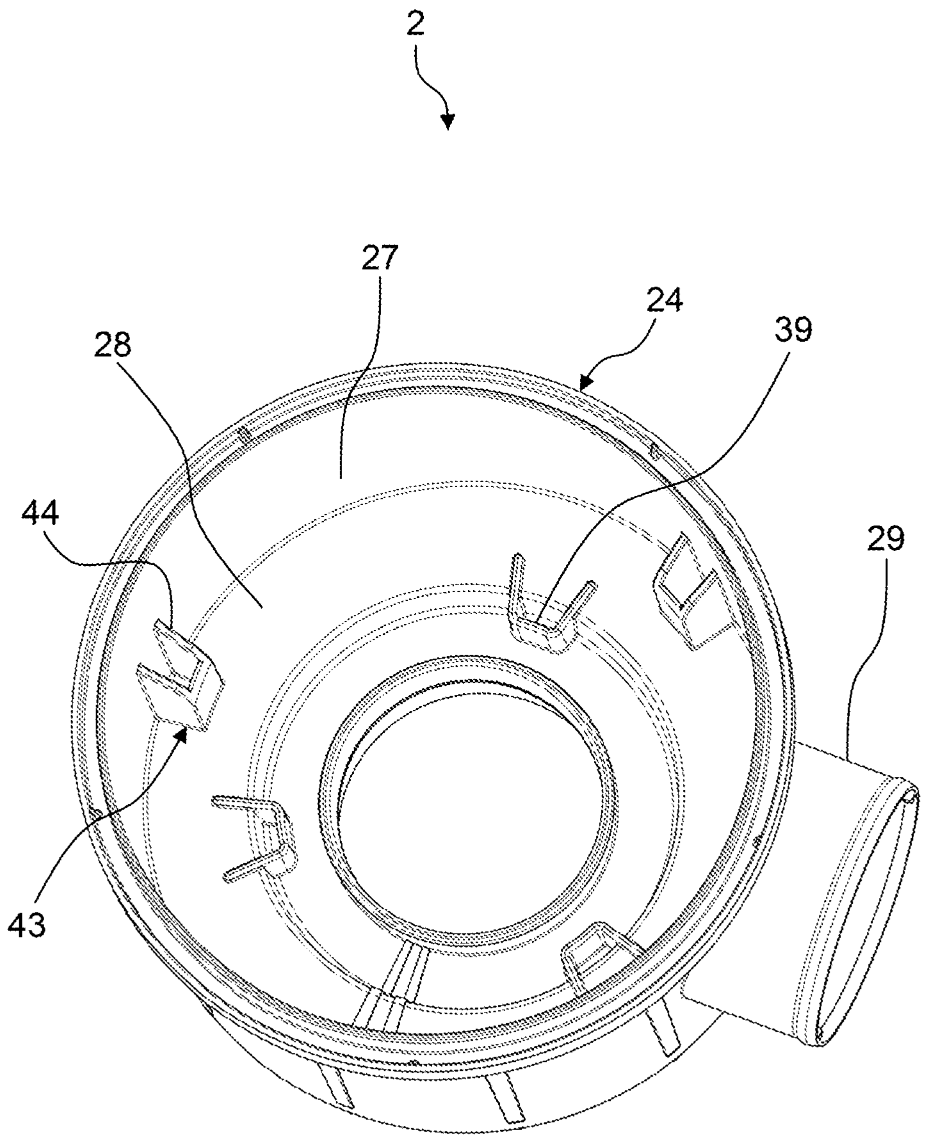
FIG. 9 shows a schematic perspective view of an embodiment of a filter housing for the filter system according to FIG. 1.
Figure 10:
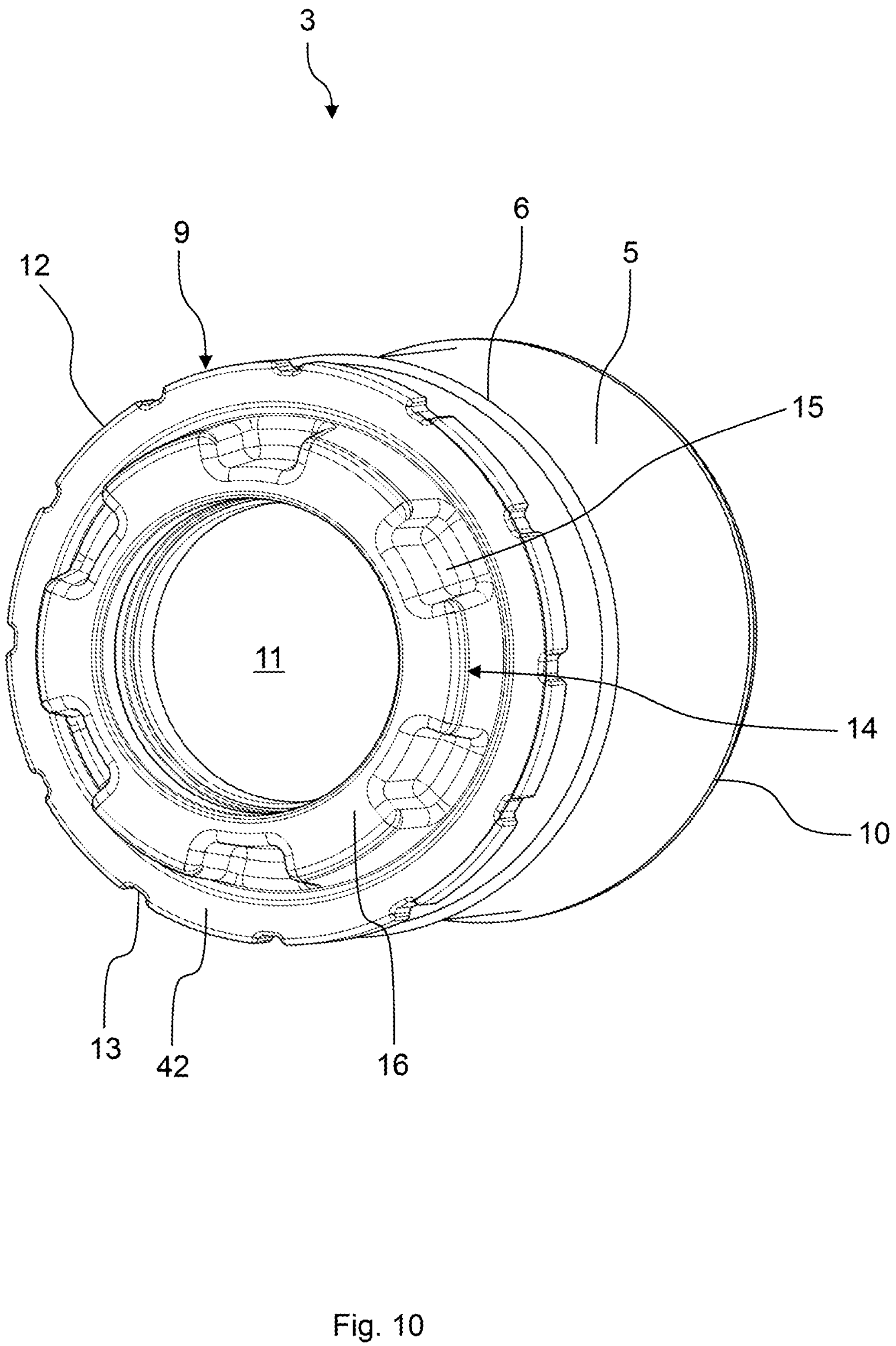
FIG. 10 shows a schematic perspective view of an embodiment of a filter element for the filter system according to FIG. 1.
Figure 11:
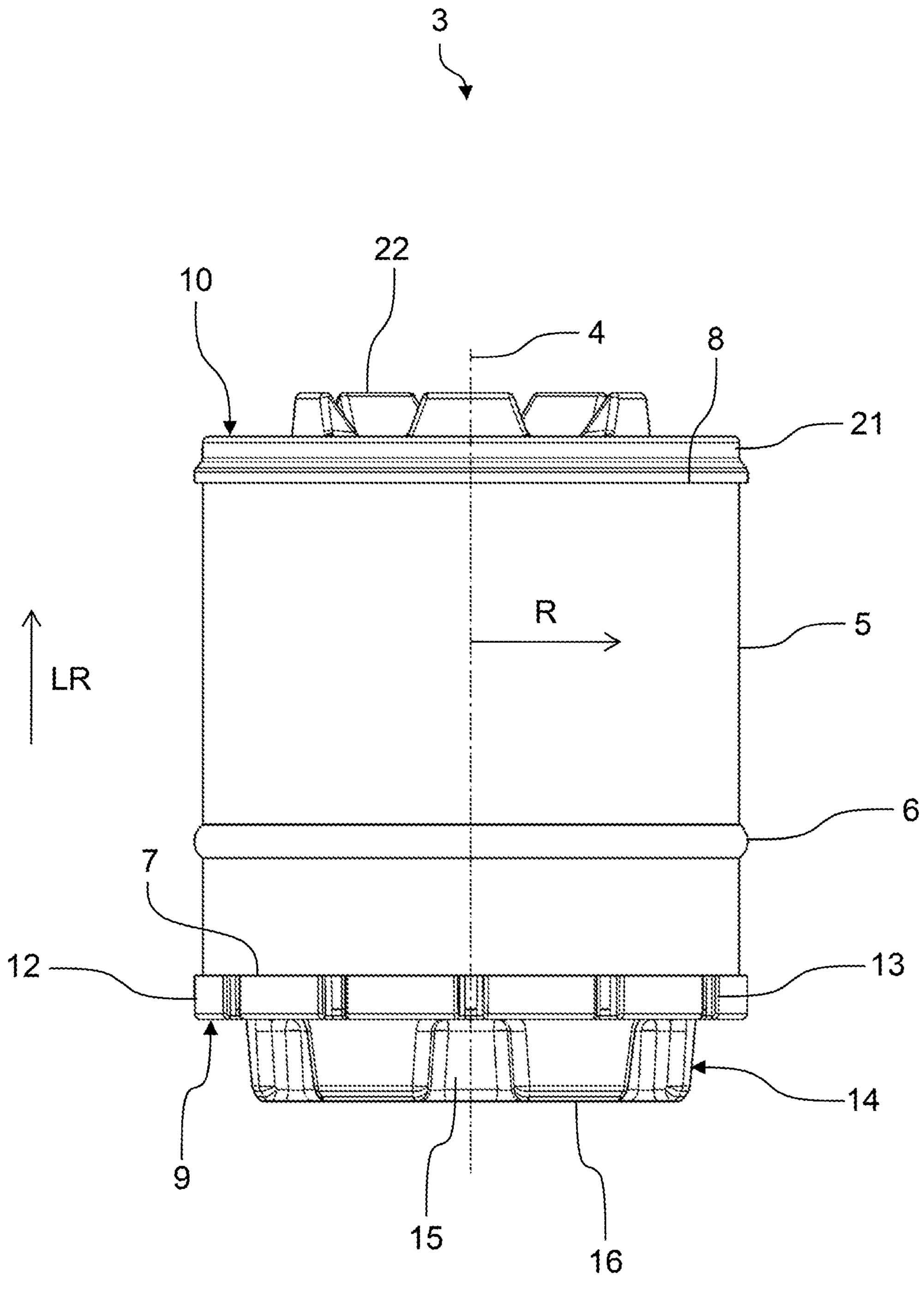
FIG. 11 shows a schematic side view of the filter element according to FIG. 10.

FIG. 1 shows a schematic plan view of an embodiment of a filter system 1. FIG. 2 shows a further schematic plan view of the filter system 1. FIG. 3 shows a schematic section view of the filter system 1 according to the section line III-III of FIG. 1. FIG. 4 shows a further schematic section view of the filter system 1 according to the section line IV-IV of FIG. 2. FIG. 5 shows a further schematic section view of the filter system 1 according to the section line IV-IV of FIG. 2. FIG. 6 shows a further schematic section view of the filter system 1 according to the section line IV-IV of FIG. 2. FIG. 7 shows the detail view VII according to FIG. 3. FIG. 8 shows the detail view IIX according to FIG. 6. FIG. 9 shows a schematic perspective view of an embodiment of a filter housing 2 for the filter system 1. FIG. 10 shows a schematic perspective view of an embodiment of a filter element 3 for the filter system 1. FIG. 11 shows a schematic side view of the filter element 3. In the following, reference is being had to FIGS. 1 through 11 at the same time.

The filter system 1 can also be referred to as filter assembly. The filter system 1 is used preferably as intake air filter for air compressors. Alternatively, the filter system 1 can however be used also as intake air filter for internal combustion engines, for example, in motor vehicles, trucks, construction vehicles, watercraft, rail vehicles, agricultural machines or vehicles, or in aircraft. The filter system 1 can also be used in immobile applications, for example, in the building technology. The filter element 3 is suitable in particular for filtering intake air of an air compressor. Preferably, the filter element 3 is an air filter element.

The filter element 3 is constructed with rotational symmetry in relation to a center or symmetry axis 4. The filter element 3 comprises a filter medium 5 which is cylinder-shaped. The filter medium 5 is constructed with rotational symmetry in relation to the symmetry axis 4. For example, the filter medium 5 can be of a closed annular shape and can be present in the form of a folded bellows folded in a star shape. The filter medium 5 is thus preferably folded.

The folded filter medium 5 can be provided with a stabilization ring 6 for stabilization thereof. The stabilization ring 6 can also be referred to as fixation coil. The stabilization ring 6 is, for example, a strip glued onto the filter medium 5 or a glued-on string. The stabilization ring 6 can be an adhesive bead or glue bead or the like, extending circumferentially completely around the symmetry axis 4 about the filter medium 5. In particular, the stabilization ring 6 can comprise a hot melt and/or hot melt-impregnated threads, for example, at least three such threads. The stabilization ring 6 serves for stabilizing the folds of the folded filter medium 5 and to thus keep their distance relative to each other identical. The stabilization ring 6, viewed along the longitudinal direction LR of the filter element 3, is positioned off-center at the filter medium 5.

In this context, the longitudinal direction LR is oriented along the symmetry axis 4. In the orientation of FIG. 11, the longitudinal direction LR can be oriented from bottom to top. The longitudinal direction LR can however also be oriented in reverse. The stabilization ring 6 in this context is provided at the exterior at the filter medium 5. "Off-center" means presently that the stabilization ring 6 in relation to a first end face 7 and a second end face 8 of the folded filter medium 5 is not centrally arranged between the two end faces 7, 8 but, for example, closer to the first end face 7 than to the second end face 8. In particular, precisely one annular stabilization ring 6, extending circumferentially completely around the symmetry axis 4, is provided.

The filter medium 5 is, for example, a filter paper, a filter fabric, a laid filter or a filter nonwoven. In particular, the filter medium 5 can be produced by a spun-bond or melt-blown method or can comprise such a fiber layer applied onto a nonwoven or cellulose support. Furthermore, the filter medium 5 can also be felted or needled. The filter medium 5 can comprise natural fibers, such as cellulose or cotton, or synthetic fibers, for example, of polyester, polyvinyl sulfite or polytetrafluoroethylene. During processing, fibers of the filter medium 5 can be oriented in, at a slant to and/or transversely to or randomly in relation to a machine direction.

The filter element 3 comprises a first, in particular open, end disk 9 which is provided at the first end face 7 of the filter medium 5. Moreover, the filter element 3 comprises a second, in particular closed, end disk 10 which is provided at the second end face 8 of the filter medium 5. This means the filter medium 5 is positioned between the first end disk 9 and the second end disk 10. The end disks 9, 10 can be manufactured, for example, of a polyurethane material which is in particular cast in casting shells, preferably foamed. The end disks 9, 10 can also be cast onto the filter medium 5. The first end disk 9 is connected to the first end face 7. The second end disk 10 is connected to the second end face 8.

The first end disk 9 comprises a centrally arranged passage 11. The passage 11 can be an outflow opening of the filter element 3. The first end disk 9 comprises a plate-shaped base section 12 which is connected to the first end face 7 of the filter element 3. The passage 11 passes through the base section 12. The exterior of the base section 12 can be provided with a plurality of grooves or cutouts 13 which are distributed uniformly around the symmetry axis 4.

Facing away from the first end face 7 of the filter medium 5, a positioning and sealing section 14 of the first end disk 9 extending in an annular shape circumferentially around the symmetry axis 4 extends away from the base section 12. By means of the positioning and sealing section 14, the filter element 3 can be positioned in the filter housing 2 and sealed relative thereto, as will be explained in the following. The passage 11 passes also through the positioning and sealing section 14.

At the exterior, i.e., facing away from the passage 11, a plurality of positioning recesses 15 are provided at the positioning and sealing section 14 of which only one is provided with a reference character in FIGS. 10 and 11, respectively. The positioning recesses 15 are arranged distributed uniformly about the symmetry axis 4. For example, six such positioning recesses 15 are provided. The number of the positioning recesses 15 is however arbitrary. Beginning at an annular end surface 16 of the positioning and sealing section 14, the positioning recesses 15, viewed along the symmetry axis 4 or along the longitudinal direction LR, comprise a depth t15 (FIG. 8). The positioning recesses 15 extend, beginning at the end surface 16, in the direction toward the base section 12.

As also shown in FIG. 8, the first end disk 9 or the positioning and sealing section 14 at the inner side, i.e., facing the passage 11, comprises a cylindrical seal surface 17 which is constructed with rotational symmetry in relation to the symmetry axis 4 and extends circumferentially completely around it. The seal surface 17 is suitable for interacting with the filter housing 2 in order to thus seal the first end disk 9 in relation to the filter housing 2 fluid-tightly. In this context, the seal surface 17 can be radially compressed. "Radially" means in this context in a direction of a radial direction R which is perpendicularly oriented in relation to the symmetry axis 4 and is pointing away from it.

Beginning at the end surface 16, the seal surface 17 extends along the longitudinal direction LR by a depth t17 into the passage 11. An annular groove or seal groove 18 extending circumferentially in a ring shape about the symmetry axis 4 adjoins the seal surface 17. Beginning at the end surface 16, the seal groove 18 ends at a depth t18 along the longitudinal direction LR. In this context, the depth t18 is smaller than the depth t15. The depth t17 is smaller than the depth t15. Viewed along the longitudinal direction LR, a cylindrical surface 19 extending circumferentially around the symmetry axis 4 adjoins the seal groove 18. Viewed relative to the radial direction R, the seal surface 17 comprises a smaller diameter than the surface 19. The seal surface 17, seal groove 18, and the surface 19 form a seal interface or interface 20 of the filter element 3. The interface 20 can also be referred to as first interface or as filter element interface. The interface 20 is suitable for interacting with the filter housing 2. Beginning at the end surface 16 of the positioning and sealing section 14, the interface 20 comprises a depth t20. The interface 20 can comprise also the positioning recesses 15.

Now returning to FIG. 11, second end disk 10 comprises a plate-shaped base section 21 which is constructed with rotational symmetry in relation to the symmetry axis 4 and closes fluid-tightly the second end face 8 of the filter element 5. Positioning elements 22 facing away from the second end face 8, of which in FIG. 11 only one is provided with a reference character, extend away from the base section 21. The number of positioning elements 22 is arbitrary. For example, five such positioning elements 22 can be provided which are arranged uniformly distributed around the symmetry axis 4.

The function of the filter element 3 will be explained in the following with the aid of FIG. 3. Fluid L to be purified, for example, air, passes from a raw side RO of the filter element 3 through the filter medium 5 to a clean side RL of the filter element 3 surrounded by the filter medium 5. This means that fluid L flows through the filter medium 5 into an interior 23 of the filter element 3 surrounded by the filter medium 5. The purified fluid L flows out of the filter element 3 through the passage 11 of the first end disk 9 as filtered fluid L.

Now returning to the filter housing 2, the latter comprises a housing bottom part 24 and a housing top part 25. The housing top part 25 can also be referred to as housing cover. The housing top part 25 can be removed from the housing bottom part 24 for exchanging the filter element 3 and can be again mounted thereon. Between the housing bottom part 24 and the housing top part 25, a seal element, for example, in the form of an O-ring, can be provided. The housing top part 25 can comprise quick connect closures 26 of which in FIG. 1 only one is provided with a reference character. The number of quick connect closures 26 is arbitrary. For example, three such quick connect closures 26 are provided which are arranged uniformly distributed around the symmetry axis 4.

By means of the quick connect closures 26, the housing top part 25 can be connected detachably to the housing bottom part 24. For this purpose, engagement sections, for example, in the form of hooks or steps, can be provided at the housing bottom part 24, in which the quick connect closures 26 engage with form fit for connecting the housing top part 25 to the housing bottom part 24. A form fit connection is produced by mutual engagement with each other or engagement from behind of at least two connection partners, presently the quick connect closures 26 and the engagement sections. The housing top part 25 comprises furthermore engagement sections which can interact with the positioning elements 22 of the second end disk 10 of the filter element 3 in such a way that the positioning elements 22 engage with form fit the engagement sections of the housing top part 25. For example, the housing top part 25 is an injection-molded plastic part.

The housing bottom part 24 is embodied in a cup shape and comprises a cylindrical base section 27 which is constructed with rotational symmetry in relation to the symmetry axis 4. At the end face, the base section 27 is closed by means of a bottom section 28. The base section 27 and the bottom section 28 are constructed as one piece, in particular monolithic as one piece. "One piece" or "one part" means presently that the base section 27 and the bottom section 28 form a common component and are not assembled of different individual components. "Monolithic as one piece" means presently that the base section 27 and the bottom section 28 are manufactured throughout of the same material. For example, the housing bottom part 24 is an injection-molded plastic part.

The housing bottom part 24 comprises a fluid inlet 29 which is of a tubular configuration. The fluid inlet 29 is constructed with rotational symmetry in relation to a center or symmetry axis 30. The symmetry axis 30 is positioned perpendicularly to the symmetry axis 4. Through the fluid inlet 29, the fluid L to be purified can be supplied at the raw side to the filter element 3. Furthermore, the housing bottom part 24 comprises a fluid outlet 31 which is provided at the bottom section 28. The fluid outlet 31 is tubular and constructed with rotational symmetry in relation to the symmetry axis 4. Through the fluid outlet 31, the purified fluid L can be discharged from the filter element 3.

The fluid outlet 31 extends, beginning at the bottom section 28 of the housing bottom part 24, outwardly in the direction away from the filter element 3. Furthermore, as an extension of the fluid outlet 31, a tubular interface 33 (FIG. 8) extends into an interior 32 (FIGS. 3 to 6) of the housing bottom part and interacts with the interface 20 of the filter element 3 in order to seal the filter element 3 in relation to the housing bottom part 24. The interface 33 is of a tubular configuration and embodied with rotational symmetry in relation to the symmetry axis 4. The interface 33 can also be referred to as second interface or as filter housing interface.

At the inner side at the interface 33, this means facing away from the interface 20 of the filter element 3, a disturbance contour 34 is provided at the interface 33. The disturbance contour 34 is, for example, embodied as a plurality of grooves extending along the longitudinal direction LR. The disturbance contour 34 prevents that a filter element that does not belong to the filter system 1 can be mounted at the interface 33 which would radially inwardly seal relative to the interface 33.

The interface 33 extends, as mentioned before, from the bottom section 28 into the interior 32 of the housing bottom part 24. In this context, the interface 33 comprises a cylindrical seal surface 35 which is constructed with rotational symmetry in relation to the symmetry axis 4 and which interacts with the seal surface 17 of the filter element 3. In particular, the seal surfaces 17, 35, viewed in the radial direction R, are radially compressed with each other.

Viewed along the longitudinal direction LR, a nose or seal rib 36 extending circumferentially in an annular shape about the symmetry axis 4 adjoins the seal surface 35. The seal rib 36 is suitable to engage with form fit the seal groove 18 of the interface 20. Viewed in the longitudinal direction LR, a cylindrical centering surface 37 is provided behind the seal rib 36. The centering surface 37 is suitable to center or to guide the seal surface 17 of the filter element 3 upon installation thereof in the housing bottom part 24 in relation to the symmetry axis 4. Between the surface 19 and centering surface 37, a gap 38, in particular an air gap, is provided.

As illustrated in FIG. 9, at the bottom section 28 of the housing bottom part 24 disturbance geometries 39 are provided of which in FIG. 9 only one is provided with a reference character. For example, three or five such disturbance geometries 39 are provided which are arranged uniformly distributed around the symmetry axis 4. The number of disturbance geometries 39 is arbitrary. The disturbance geometries 39 are suitable to engage with form fit the positioning recesses 15 of the first end disk 9. The disturbance geometries 39 project, beginning at the bottom section 28, into the interior 32. The disturbance geometries 39 prevent furthermore the installation of a filter element, without positioning recesses 15 and not matching the filter system, into the housing bottom part 24.

Viewed from an end surface 40 (FIG. 8) of the bottom section 28 against which the end surface 16 rests, each disturbance geometry 39, viewed along the longitudinal direction LR, has a depth t39. In this context, the depth t39 is larger than the depth t18 and smaller than the depth t15. Each disturbance geometry 39 comprises an end surface 41 which is oriented parallel to the end surface 40 and spaced apart therefrom. The base section 12 of the first end disk 9 comprises an end surface 42. The end surfaces 41, 42 are positioned parallel to each other and spaced apart from each other.

In the housing bottom part 24, furthermore centering geometries 43 are integrally formed of which in FIGS. 2 and 9 only one is provided with a reference character, respectively. For example, three or five such centering geometries 43 can be provided which are arranged uniformly distributed around the symmetry axis 4. Each centering geometry 43 comprises a top edge 44 which is inclined at a slant relative to the symmetry axis 4.

The installation of the filter element 3 in the filter housing 2 will be explained in the following with the aid of FIGS. 4 to 6 and 8. First, the filter element 3 is inserted into the housing bottom part 24 in an insertion direction E which is oriented along the symmetry axis 4. The insertion direction E is oriented in this context from the second end disk 10 in the direction of the first end disk 9. The longitudinal direction LR and the insertion direction E can be oppositely oriented. In this context, a pre-centering of the filter element 3 by means of the plate-shaped base section 12 of the first end disk 9 at the centering geometries 43 takes place. By means of the centering geometries 43, the filter element 3 is centered in relation to the symmetry axis 4 so that the end surface 16 of the positioning and sealing section 14 of the first end disk 9 contacts the end surfaces 41 of the disturbance geometries 39 (FIG. 5). This means that the interfaces 20, 33 are not yet in engagement with each other.

From the position illustrated in FIG. 5, the filter element 3 can now be rotated about the symmetry axis 4 until the disturbance geometries 39 are aligned with the positioning recesses 15 of the positioning and sealing section 14 so that the filter element 3 can be pushed farther into the housing bottom part 24 along the insertion direction E. Upon rotation of the filter element 3 about the symmetry axis 4, the seal surface 17 of the first end disk 9 is guided at the centering surface 37 of the interface 33 and is centered in relation to the symmetry axis 4. As soon the disturbance geometries 39 engage the positioning recesses 15, the positioning and sealing section 14 is elastically deformed such that the seal rib 36 engages with form fit the seal groove 18. At the same time, the seal surfaces 17, 35 are radially compressed against each other. The end surfaces 16, 40 rest against each other. The filter element 3 is mounted in the housing bottom part 24.

The filter system 1 comprises furthermore a muffler 45 (FIGS. 1 to 3 and 7) which is attached to the fluid inlet 29. The muffler 45 is preferably a one-part plastic component, in particular monolithic as one piece. The muffler 45 can be an injection-molded plastic part. The muffler 45 is constructed with rotational symmetry in relation to the symmetry axis 30. The muffler 45 comprises at the exterior a plurality of fluid guiding ribs 46 which extend parallel to the symmetry axis 30. The fluid guiding ribs 46 are provided at the exterior at a tubular base body 47 of the muffler 45. The fluid L to be purified is supplied to the filter element 3 through the muffler 45.

The base body 47 comprises a truncated cone-shaped inlet 48 as well as an also truncated cone-shaped outlet 49. The inlet 48 and outlet 49 are in fluid communication with each other. The inlet 48 and outlet 49 are arranged such that the truncated cone-shaped geometries are positioned such that between the inlet 48 and outlet 49 a cross section constriction 51 that is rounded by a rounded portion 50 is provided. The inlet 48 is facing away from the fluid inlet 29. The outlet 49 is facing the fluid inlet 29. The inlet 48 and outlet 49 together form thus an hourglass-shaped or trumpet-shaped geometry. The outlet 49 comprises an inflow cross section A of the fluid inlet. The filter medium 5 is provided with inflow via the inflow cross section A.

At the inlet 48, furthermore an inlet rounded portion 52 is provided which extends circumferentially completely around the symmetry axis 30. The inlet rounded portion 52 extends circumferentially completely around an inlet opening 53 of the base body 47. The base body 47 passes into a tubular fastening section 54. The fastening section 54 can comprise snap hooks 55 by means of which the muffler 45 is connected to the fluid inlet 29 by form fit. Between the fastening section 54 and base body 47, a rib 56 extending circumferentially completely around the symmetry axis 30 can be provided. The rib 56 in this context is arranged perpendicularly to the symmetry axis 30. The rib 56 is received in the fluid inlet 29. The fluid guiding ribs 46 are provided at an exterior side 57 (FIGS. 1 and 2) of the base body 47. The outlet 49 comprises an outlet opening 58. A diameter of the outlet opening 58 is smaller than a diameter of the inlet opening 53.

In operation of the filter system 1, the fluid L to be filtered is sucked in around the inlet rounded portion 52 laterally into the inlet opening 53 and thus into the inlet 48, as illustrated in FIG. 7 by means of the arrows 59, 60. The fluid L flows thus along the fluid guiding ribs 46 which supply the fluid to the inlet 48. Through the base body 47, the fluid L flows along an in particular first flow direction SR1. The flow direction SR1 is oriented from the inlet opening 53 in the direction of the filter element 3. The fluid guiding ribs 46 extend along or parallel to the flow direction SR1.

The fluid L flows at the exterior at the base body 47 along the fluid guiding ribs 46 in an in particular second flow direction SR2. The flow directions SR1, SR2 are oppositely oriented. The flow direction SR2 is oriented along the radial direction R. The flow direction SR1, on the other hand, is oriented opposite to the radial direction R. The fluid guiding ribs 46 extend also along the flow direction SR2.

Immediately upstream of the inlet 48, a region 61 is provided in which the fluid L substantially has no movement. This means that the fluid L to be filtered is substantially sucked in only along the fluid guiding ribs 46 in the direction of the inlet rounded portion 52 and around the latter into the inlet 48. The sucked-in fluid L impacts on the filter medium 5, wherein the stabilization ring 6 prevents a movement of folds of the folded filter medium 5. In this context, the stabilization ring 6, viewed along the longitudinal direction LR, is positioned centrally in the inflow cross section A of the fluid inlet 29.

In particular, the filter medium 5 is protected by means of the stabilization ring 6 from pulsations. In this way, a noise reduction is provided. The stabilization ring 6 in this context is centrally arranged in relation to the muffler 45. This means the symmetry axis 30 extends preferably centrally through the stabilization ring 6. The double cone shape of the inlet 48 and of the outlet 49 provides for noise reduction.

REFERENCE CHARACTERS

1 filter system
2 filter housing
3 filter element
4 symmetry axis
5 filter medium
6 stabilization ring
7 end face
8 end face
9 end disk
10 end disk
11 passage
12 base section
13 cutout
14 positioning and sealing section
15 positioning recess
16 end surface
17 seal surface
18 seal groove
19 surface
20 interface
21 base section
22 positioning element
23 interior
24 housing bottom part
25 housing top part
26 quick connect closure
27 base section
28 bottom section
29 fluid inlet
30 symmetry axis
31 fluid outlet
32 interior
33 interface
34 disturbance contour
35 seal surface
36 seal rib
37 centering surface
38 gap
39 disturbance geometry
40 end surface
41 end surface
42 end surface
43 centering geometry
44 top edge
45 muffler
46 fluid guiding ribs
47 base body
48 inlet
49 outlet
50 rounded portion
51 cross section constriction

52 inlet rounded portion
53 inlet opening
54 fastening section
55 snap hook
56 rib
57 exterior side
58 outlet opening
59 arrow
60 arrow
61 region
A inflow cross section
E insertion direction
L fluid
LR longitudinal direction
R radial direction
RL clean side
RO raw side
SR1 flow direction
SR2 flow direction
t15 depth
t17 depth
t18 depth
t20 depth
t39 depth

What is claimed is:

1. A muffler for a filter system, the muffler comprising:
a base body comprising an inlet opening;
a fluid guiding rib externally arranged on the base body and configured to guide a fluid to be filtered by the filter system from an externo side base body toward the inlet opening of the base body;
wherein the fluid guiding rib extends along the exterior of the base body, and wherein the fluid to be filtered passes through the base body a first flow direction.

2. The muffler according to claim 1, wherein the fluid guiding rib guides the fluid to be filtered along the exterior side of the base body in a second flow direction, and wherein the second flow direction is oriented opposite to the first flow direction.

3. The muffler according to claim 1, wherein the base body is constructed with rotational symmetry in relation to a symmetry axis, and wherein the fluid guiding rib extends along the symmetry axis.

4. The muffler according to claim 3, wherein the inlet opening is rounded by an inlet rounded portion extending circumferentially around the symmetry axis.

5. The muffler according to claim 4, wherein the inlet rounded portion extends out of the inlet opening to the exterior side of the base body.

6. The muffler according to claim 3, wherein the base body comprises a truncated cone-shaped inlet comprising the inlet opening and further comprises a truncated cone-shaped outlet, and wherein the inlet and the outlet are arranged such that the inlet passes via a cross section constriction into the outlet.

7. The muffler according to claim 6, wherein the cross section constriction is rounded by a rounded portion extending circumferentially about the symmetry axis.

8. The muffler according to claim 6, wherein the outlet, viewed along the symmetry axis, is longer than the inlet.

9. The muffler according to claim 3, wherein the fluid guiding rib extends radially away from the symmetry axis in an outward direction toward the exterior side of the base body.

10. The muffler according to claim 1, comprising a plurality of said fluid guiding rib arranged uniformly distributed relative to each other about a circumference of the base body.

11. A filter system comprising:
a filter housing;
a filter element removably received in the filter housing;
a muffler according to claim 1, the muffler attached to the filter housing.

12. The filter system according to claim 11, wherein the muffler is connected with form fit to a fluid inlet of the filter housing.

13. The filter system according to claim 11, wherein an intermediate space is provided between the muffler and the filter element.

14. The filter system according to claim 11, wherein the muffler and the filter element are two components separate from each other.

15. The filter system according to claim 11, wherein the muffler is arranged, at least in sections, outside of the filter housing.

* * * * *